Patented Apr. 13, 1926.

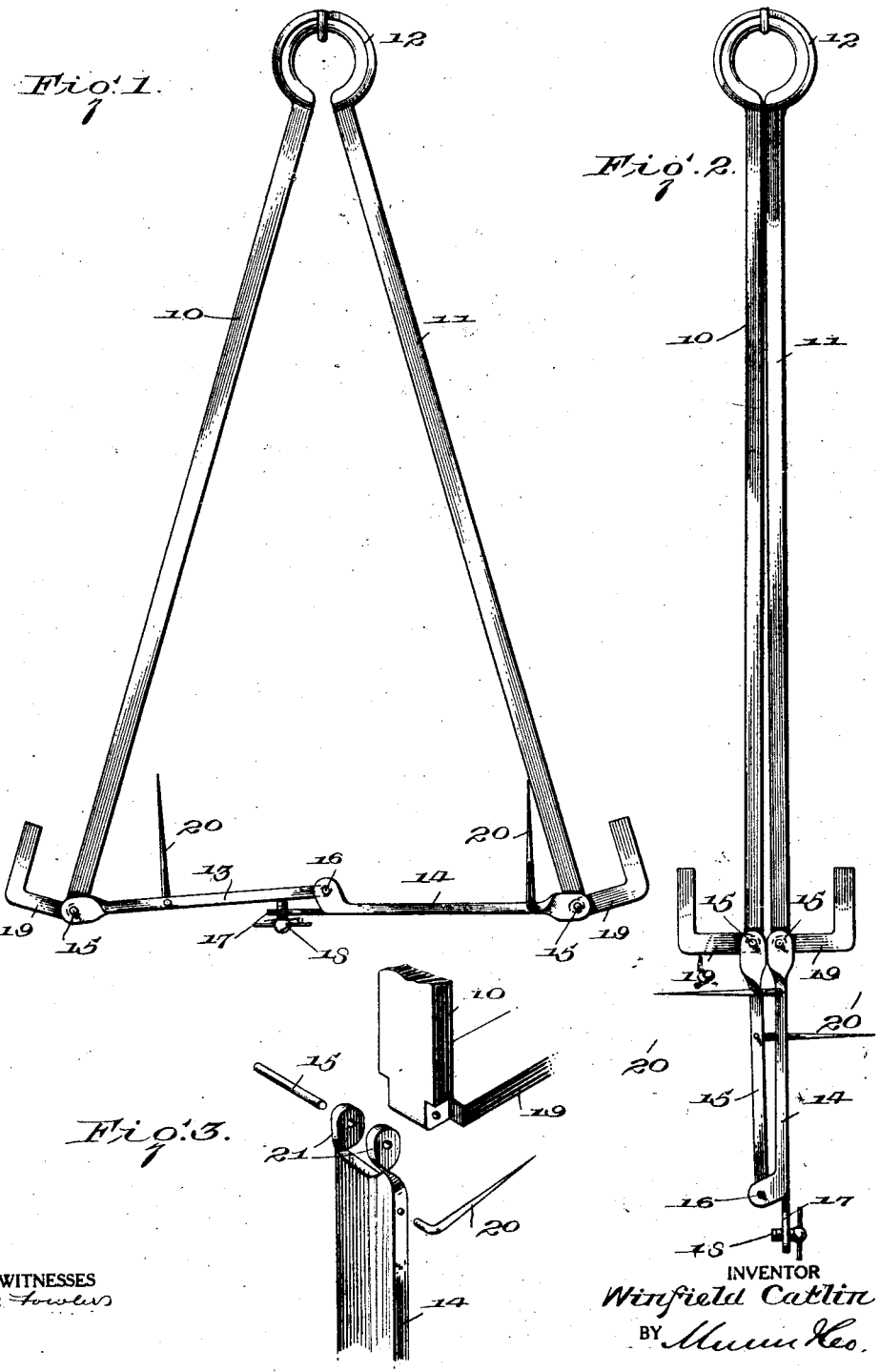

1,580,583

UNITED STATES PATENT OFFICE.

WINFIELD CATLIN, OF ROCKVILLE, INDIANA, ASSIGNOR OF ONE-HALF TO CLARENCE A. WEAVER, OF HILLSBORO, INDIANA.

ANIMAL TRAP.

Application filed February 28, 1925. Serial No. 12,386.

*To all whom it may concern:*

Be it known that I, WINFIELD CATLIN, a citizen of the United States, and a resident of Rockville, in the county of Parke and State of Indiana, have invented certain new and useful Improvements in Animal Traps, of which the following is a specification.

My present invention relates generally to animal traps, and more particularly to a trap of small size, which will be strong and durable, may be easily and quickly set, will be positive and humane in its action, and may be easily and quickly adjusted so as to render it more or less sensitive in action.

A still further object is the provision of an animal trap which will be economical to manufacture and in use.

In the accompanying drawing which illustrates an embodiment of my present invention and forms a part of this specification, Figure 1 is a front view of the trap showing the parts in the set position, Figure 2 is a partial front elevation with the parts in the collapsed or sprung position, and Figure 3 is a detailed perspective view of the adjacent portions of one of the spring arms and the trip bar, showing the same detached.

Referring now to these figures, and particularly to Figures 1 and 2, I have shown a trap including in the present instance, a pair of normally contiguous parallel clamping arms 10 and 11, integrally united at one end, by a loop or the like 12, which not only forms an effective point of connection for a trap anchoring chain or the like, but also augments the action of the resilient or spring material of which the arms and the loop are formed. In its most important respect however, my invention may employ spring arms or actuating springs of other characters.

In the active position, the free ends of the arms 10 and 11 are spaced substantially apart by means of a trip bar in sections 13 and 14 whose outer ends are pivotally connected at 15 with the free ends of the arms. At their inner ends the sections 13 and 14 are pivoted at 16 to one another in the overlapping relation shown especially in Figure 1, the overlapping end 17 of section 14 having a set screw 18 adjustable therethrough for engagement with the section 13 adjacent to the inner end of the latter whereby to limit inward swinging movement of the inner ends of the trip bar sections and in this way form a brace across the spread ends of the spring arms.

It is obvious that in forming the above brace no limit is placed upon the outward swinging of the trip bar sections except that the center pivot 16 between the sections 13 and 14 must be shifted outwardly beyond a line connecting the outer pivots 15 before they can continue to swing outwardly under tension of the spring arms 10 and 11. It is this last mentioned movement which results in the collapse of the trip bar sections against one another and at the same time the collapse of the previously spread apart spring arms 10 and 11 against one another and it is likewise this movement of the parts which traps the animal by catching the same either between the trip bar sections or between the spring arms.

To set the trap it is necessary to force the free ends of the spring arms 10 and 11 away from one another and to facilitate such movement, these spring arms are at their free ends provided with integral angularly outstanding extensions 19 forming handles so that the before mentioned spreading of the spring arms may be accomplished without subjecting the operator to the danger of being accidentally caught therebetween.

By adjusting the set screw to more or less straighten the trip bar sections 13 and 14 in the set position, the sensitiveness of the trap in action may be readily controlled, it being obviously intended that the animal passing between the spring arms 10 and 11 will step upon the central portion of the trip bar and thus flex the bar at its center downwardly and outwardly which leads to the immediate collapse of the trap and secure gripping of the animal.

In order to avoid lengthy suffering of the animal, the trip bar sections 13 and 14 may each be provided with a penetrating prong or spur 20, these spurs having sharpened free ends and angular opposite ends and being arranged upon relatively opposite sides of the sections 13 and 14 so that the latter freely go together in the collapsed position as in Figure 2. Moreover, the angular ends of the spurs are preferably threaded into the respective sides of the trip bar sections so that they may be turned to lie lengthwise along the sides of the trip bar sections when the trap is wrapped for transportation in the first instance as well as when it is later to be carried from place to place in use.

At the point of bending of the spring arms 10 and 11 at their free ends to form the integral angular extensions 19, they are preferably reduced to some extent laterally as shown in Figure 3, and the outer ends of the trip bar sections are provided with side ears 21 apertured for the reception of the pivot pin 15 which passes also through the reduced portions of the spring arms just mentioned. This particular form of connection may, however, be varied so long as a pivot permitting ready flexure remains and the specific details of the other connections may also be varied without interfering with the proper and intended functions and operations of the trap as outlined, and it is also obvious that my improved trip bar may be employed with various types of spring arms and actuating springs such as used in many traps of general knowledge.

I claim:—

1. An animal trap having actuating spring members connected to one another at one end, and a trip bar spreading the free ends of said spring members apart in the set position, the said spring members being collapsible flatwise against one another and the said trip bar including a pair of sections pivotally joined at their outer ends to the said free ends of the spring members and cooperating therewith to support the spring members in upright position when the trap is set, said bar sections being pivoted in overlapping relation to one another at their inner ends to fold and collapse outwardly away from the spring members, and flatwise against one another in line with the collapsed spring members when the bar is tripped.

2. An animal trap including actuating spring members connected to one another at one end and collapsible flatwise against one another, a trip bar normally spreading the free ends of the spring members apart in the set position, and in sections collapsible flatwise against one another outwardly away from and in line with the spring members, and penetrating spurs in connection with the sides of the trip bar sections and turnable with respect thereto whereby they may be shifted to right angular positions in use and to positions in line with the trip bar sections when the latter are collapsed, for the purpose described.

WINFIELD CATLIN.